United States Patent Office 3,304,120
Patented Feb. 14, 1967

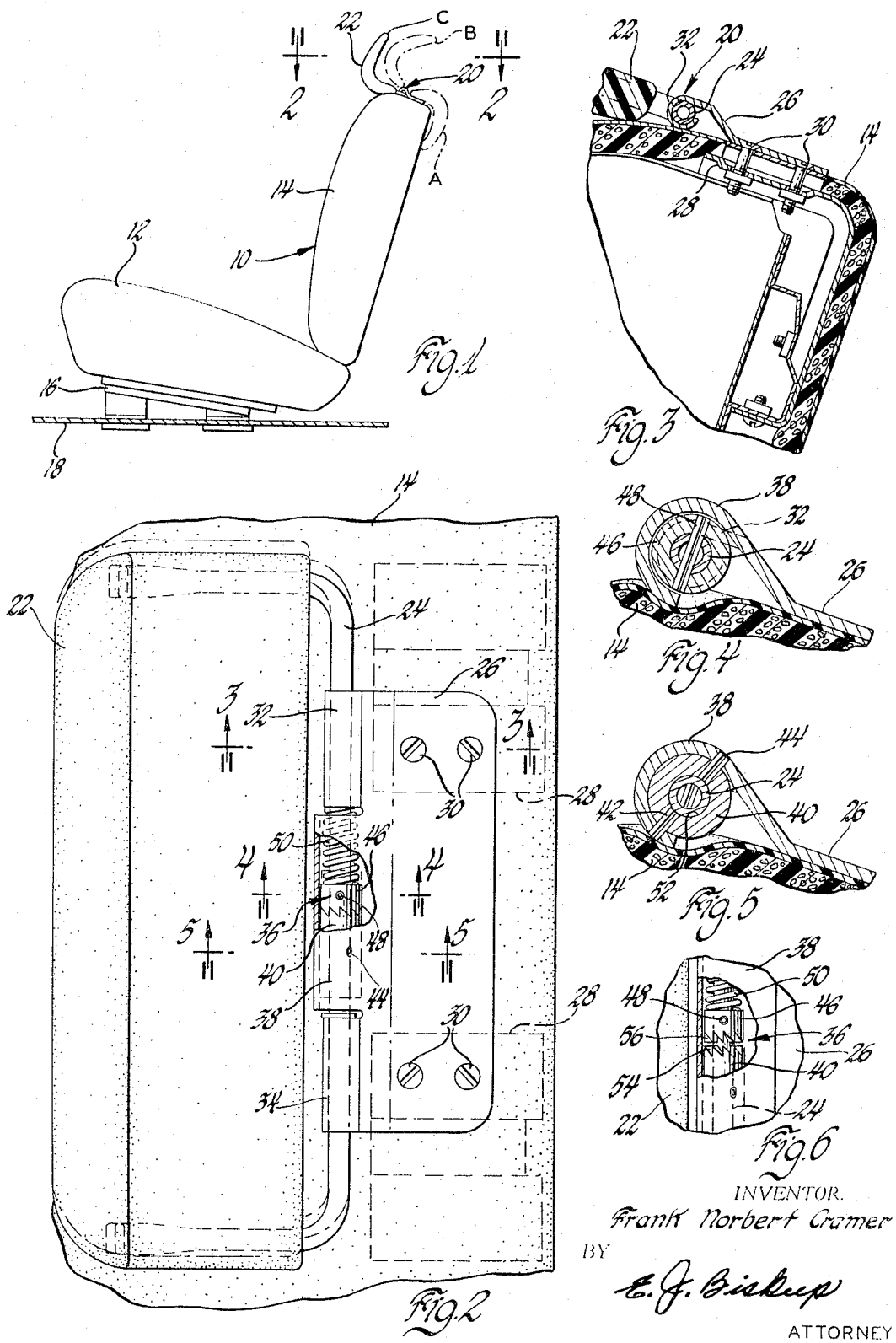

3,304,120
ADJUSTABLE HEADREST FOR A SEAT
Frank Norbert Cramer, Warren, Mich., assignor to General Motors Corporation, Detroit, Mich., a corporation of Delaware
Filed Dec. 30, 1965, Ser. No. 517,693
1 Claim. (Cl. 297—403)

This invention relates to a headrest and more particularly to a headrest adapted to be supported on the upper surface of a seat back for movement between a stored position and a plurality of headrest forming positions and the means for holding the headrest in such positions.

The present trend in automotive seating structure is to provide more accessories to increase the comfort of the vehicle seat. One of the accessories being offered for increased comfort is a headrest. The more common headrest accessory being offered for motor vehicles is removable and is only adjustable vertically relative to the seat. Such headrests present a storage problem when they are removed from the seat back and vertical adjustment alone does not provide the variety of comfortable positions available from a headrest that is adjustable fore and aft relative to the plane of the set back.

It is an object of this invention to provide an adjustable headrest that may be easily moved from a stored position adjacent the top rear of the seat back to a plurality of headrest forming positions forwardly and above the stored position.

Another object of this invention is to provide a headrest having a brake mechanism for securing the headrest in the plurality of headrest positions.

A further object of this invention is to provide a simple brake mechanism which holds the headrest in the desired position of adjustment and allows movement from the stored positions to any of its headrest forming positions by a simple application of manual pressure to the headrest itself to accomplish such movement.

Another object of this invention is to provide a brake member whereby axial movement along the pivotal axis of the headrest will release its holding member allowing the headrest to be pivoted to its stored positions.

These and other objects of this invention will become more apparent as reference is had to the following specification and the drawings wherein:

FIGURE 1 is a side view of the seating unit mounted in a vehicle showing the headrest of this invention in the headrest forming position and illustrating, in phantom lines, the headrest in the stored position and a second headrest forming position.

FIGURE 2 is an enlarged view along the line 2—2 of FIGURE 1, in the direction of the arrows, with portions cut away, showing the brake arrangement for holding the headrest in the desired position of adjustment and, in phantom lines, showing the position of the headrest when the brake members are separated to permit the movement of the headrest to the stored position.

FIGURE 3 is a view substantially along the line 3—3 of FIGURE 2, in the direction of the arrows, showing the manner in which the pintle supporting the headrest is journaled in the hinge plate secured to the seat back frame.

FIGURE 4 is a view substantially along the line 4—4 of FIGURE 2, in the direction of the arrows, illustrating the manner in which the movable brake member is secured to the hinge pintle for movement therewith.

FIGURE 5 is a view substantially along the line 5—5 of FIGURE 2, in the direction of the arrows, illustrating the manner in which the fixed brake member is secured to the hinge plate and acts as a bearing for the hinge pintle.

FIGURE 6 is a view of a portion of FIGURE 2 showing the brake members at their released position whereby the headrest may be pivoted in either direction to its desired position of adjustment.

Referring now to the drawings, as best seen in FIGURE 1, a seating unit 10 consisting of a seat cushion 12 and a seat back cushion 14 are supported by conventional seat adjuster means 16 on a vehicle floor 18.

The headrest unit, indicated generally by the numeral 20, is secured to the top surface of the seat back 14. As best seen in FIGURES 1, 2 and 3, the headrest unit 20 includes a headrest 22 secured, in a suitable manner, to a U-shaped support rod 24, which also serves as a hinge pintle for the headrest 22, and is journaled in the anchor plate 26. The anchor plate 26 is secured to the seat back frame 28 of the seat back 14 by bolts 30 or other suitable means. Two portions 32 and 34 of the anchor plate 26 are curved about the pintle 24 to form bearings for the pintle 24. The pintle 24 may be rotated or moved axially in the bearings 32, 34.

The pintle 24 supports the headrest 22 for rotational movement from the stored position A adjacent the top and rear of the seat back 14, as seen in FIGURE 1, to any of a plurality of headrest positions such as shown at position B and full forward position C. Positions B and C are used for illustrative purposes only and it is to be understood that the headrest is movable to other headrest forming positions.

A brake means for holding the headrest 22 in its various positions of adjustment, as can best be seen in FIGURES 2 and 6, is contained within a large curved section 38 of the hinge plate 26. The brake means 36 includes a fixed brake member 40 secured in the curved section 38 by spring pins 42, 44, as best seen in FIGURE 5. A movable brake member 46 is secured to the pintle 24 by means of spring pin 48, as best seen in FIGURE 4. A compression coil spring 50 is positioned about pintle 24 and has one end positioned against bearing portion 32 of the hinge plate 26 and the other end against the movable brake member 46 for urging the brake member 46 into contact with the fixed brake member 40. The fixed brake member 40 also serves as a bearing for the pintle 24 which is rotatable and axially slidable within the inner diameter 52 of the brake member. The adjacent lateral faces of brake members 40 and 46 are provided with mating teeth 54, 56, respectively, for securing the pintle 24 from rotation when engaged, as shown in FIGURE 2, and allowing relative motion between the brake members when separated, as shown in FIGURE 6. When the teeth 54, 56 are engaged, they are so designed that the teeth 56 will slide over the teeth 54 when the headrest is rotated in the direction from the stored position A toward full forward position C and the teeth 54, 56 will block rotation in the opposite direction.

To move the headrest 22 forwardly and upwardly from its stored position A to any of the headrest forming positions, a seat occupant need merely manually apply a rotational force to the headrest about the pintle 24 and move the headrest to its desired position. During such movement, the teeth 56 will slide over the teeth 54, by camming the movable brake member 46 towards the compression spring 50 and overcoming the biasing action of the spring, thus permitting such rotation.

To move the headrest from the full forward position C, or any other forward position to a position closer the stored position, the headrest must first be moved laterally by applying lateral pressure to the headrest axially along pintle 24 to overcome the spring 50 and move the teeth 56 clear of engagement with the teeth 54 at which time the headrest may be rotated toward the stored position. When the desired headrest position or stored position is attained by such movement, the lateral pressure on the headrest is removed and the biasing action of the spring 50 will move the teeth 56 into engagement with the teeth 54, thereby securing the headrest in the new position.

While the embodiment of the invention here described is preferred, it is to be understood that modifications may be made by the exercise of skill in the art which will lie within the scope of the following claim.

I claim:

In combination on a seating unit having a seat and a seat back, a headrest unit secured to the seat back, said headrest unit including a hinge plate secured to said seat back, a hinge pintle, said hinge plate having a pair of integral portions wound about said hinge pintle for supporting the latter for rotation and axially slidable movement, an adjustable headrest secured to said pintle for movement therewith, said headrest having a stored position adjacent the top and rear of said seat back and a plurality of head supporting positions above and forward of said stored position and being movable therebetween by the pivotal action of said pintle, a brake for holding said headrest in the selected position of adjustment including a fixed brake member secured to said hinge plate, said fixed brake member located between said pair of integral portions and serving as a bushing for rotatably supporting the pintle, a movable brake member secured to said pintle for movement therewith, a compression spring having one end bearing against the hinge plate and the other end bearing against said movable brake member for urging said movable brake member and said pintle axially toward said fixed brake member for engagement therewith, said members having teeth for coacting when said members are engaged for restricting rotational movement of said headrest toward said stored position, said teeth allowing rotation of said headrest in the direction from stored position to the head supporting positions by sliding contact between the teeth whereby the biasing action of the compression spring is overcome and the movable brake member moves axially away from the fixed brake member a sufficient distance for the teeth on said members to clear each other for allowing relative movement therebetween.

References Cited by the Examiner
UNITED STATES PATENTS

| | | | |
|---|---|---|---|
| 2,592,045 | 4/1952 | LeMoir | 297—427 X |
| 2,917,109 | 12/1959 | Marsh | 297—408 X |
| 3,174,799 | 3/1965 | Haltenberger | 297—403 |
| 3,186,763 | 6/1965 | Ferrara | 297—410 |

FOREIGN PATENTS 599,784   11/1959   Italy.

FRANK B. SHERRY, *Primary Examiner.*

CASMIR A. NUNBERG, *Examiner.*